(12) United States Patent
Sheynblat

(10) Patent No.: US 7,138,943 B2
(45) Date of Patent: Nov. 21, 2006

(54) METHODS AND APPARATUSES FOR USING ASSISTANCE DATA RELATING TO SATELLITE POSITION SYSTEMS

(75) Inventor: Leonid Sheynblat, Belmont, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 10/769,421

(22) Filed: Jan. 30, 2004

(65) Prior Publication Data

US 2004/0183724 A1 Sep. 23, 2004

Related U.S. Application Data

(62) Division of application No. 09/813,597, filed on Mar. 20, 2001, now Pat. No. 6,720,915.
(60) Provisional application No. 60/190,600, filed on Mar. 20, 2000, and provisional application No. 60/228,258, filed on Aug. 25, 2000.

(51) Int. Cl.
*G01S 5/02* (2006.01)
*H04B 7/185* (2006.01)

(52) U.S. Cl. .............................. 342/357.09; 342/357.06
(58) Field of Classification Search ................ 342/352, 342/357.05, 357.06, 357.09, 357.12, 357.15; 701/213, 215

See application file for complete search history.

(56) References Cited

U.S. PATENT DOCUMENTS

| | | | | |
|---|---|---|---|---|
| 5,752,218 A | * | 5/1998 | Harrison et al. | 701/207 |
| 6,075,987 A | * | 6/2000 | Camp et al. | 455/427 |
| 6,133,874 A | * | 10/2000 | Krasner | 342/357.15 |
| 6,324,213 B1 | * | 11/2001 | Harrison | 375/240 |
| 6,493,557 B1 | * | 12/2002 | Yoshida | 455/456.3 |
| 2001/0044681 A1 | * | 11/2001 | Diana et al. | 701/19 |

* cited by examiner

*Primary Examiner*—Dao Phan
(74) *Attorney, Agent, or Firm*—Philip R. Wadsworth; Bruce W. Greenhaus; Thomas M. Thibault

(57) ABSTRACT

Methods and apparatuses to obtain an ordered set of satellite positioning system (SPS) satellites, in view of a mobile SPS receiver, via one or two-way communication with the mobile SPS receiver. The mobile SPS receiver receives, in one embodiment, an ordered set of SPS satellites from a cellular transmission site. The ordered set of satellites are those in view of the mobile SPS receiver at a given time; such that the mobile SPS receiver may search for the SPS satellites according to an order of the ordered set of SPS satellites. The order of the ordered set may be obtained by various methods one of which is by minimizing the geometric dilution of precision (GDOP) Satellite; health data may be included in the transmission.

6 Claims, 6 Drawing Sheets

METHODS AND APPARATUSES FOR USING ASSISTANCE DATA RELATING TO SATELLITE POSITION SYSTEMS

RELATED APPLICATIONS

This application is a divisional of U.S. patent application Ser. No. 09/813,597, filed on Mar. 20, 2001 now U.S. Pat. No. 6,720,915, and is related to and hereby claims the benefit of the filing dates of two provisional applications by the same inventor, Leonid Sheynblat. The first provisional application is entitled, Methods and Apparatus for Using Assistance data Relating to Satellite Position Systems, Ser. No. 60/190,600, filed on Mar. 20, 2000. The second provisional application is entitled Method and Apparatus for Using Satellite Status Information in Satellite Positioning Systems, Ser. No. 60/228,258, filed on Aug. 25, 2000.

FIELD OF THE INVENTION

The present invention relates to receivers capable of determining position information of satellites and in particular, relates to such receivers which find application in satellite positioning systems (SPS) such as the U.S. Global Positioning System (GPS).

BACKGROUND OF THE INVENTION

GPS receivers normally determine their position by computing times of arrival of signals transmitted simultaneously from a multiplicity of GPS (or NAVSTAR) satellites. These satellites transmit, as part of their message, both satellite positioning data as well as data on clock timing, so-called "ephemeris" data. The process of searching for and acquiring GPS signals, reading the ephemeris data for a multiplicity of satellites and computing the location of the receiver from this data is time consuming, often requiring several minutes. In many cases, this lengthy processing time is unacceptable and, furthermore, greatly limits battery life in miniaturized portable applications.

GPS receiving systems have two principal functions. The first is the computation of the pseudoranges to the various GPS satellites, and the second is the computation of the position of the receiver using these pseudoranges and satellite timing and ephemeris data. The pseudoranges are simply the times of arrival of satellite signals measured by a local clock. This definition of pseudorange is sometimes also called code phase. The satellite ephemeris and timing data is extracted from the GPS signal once it is acquired and tracked. As stated above, collecting this information normally takes a relatively long time (30 seconds to several minutes) and must be accomplished with a good received signal level in order to achieve low error rates.

Most GPS receivers utilize correlation methods to compute pseudoranges. These correlation methods are performed in real time, often with hardware correlators. GPS signals contain high rate repetitive signals called pseudorandom (PN) sequences. The codes available for civilian applications are called C/A (coarse/acquisition) codes, and have a binary phase-reversal rate, or "chipping" rate, of 1.023 MHz and a repetition period of 1023 chips for a code period of 1 millisecond. The code sequences belong to a family known as Gold codes, and each GPS satellite broadcasts a signal with a unique Gold code.

For a signal received from a given GPS satellite, following a downconversion process to baseband, a correlation receiver multiplies the received signal by a stored replica of the appropriate Gold code contained within its local memory, and then integrates, or low-pass filters, the product in order to obtain an indication of the presence of the signal. This process is termed a "correlation" operation. By sequentially adjusting the relative timing of this stored replica relative to the received signal, and observing the correlation output, the receiver can determine the time delay between the received signal and a local clock. The initial determination of the presence of such an output is termed "acquisition." Once acquisition occurs, the process enters the "tracking" phase in which the timing of the local reference is adjusted in small amounts in order to maintain a high correlation output. The correlation output during the tracking phase may be viewed as the GPS signal with the pseudorandom code removed, or, in common terminology, "despread." This signal is narrow band, with a bandwidth commensurate with a 50 bit per second binary phase shift keyed (BPSK) data signal which is superimposed on the GPS waveform.

The correlation acquisition process is very time consuming, especially if received signals are weak. To improve acquisition time, most GPS receivers utilize a multiplicity of correlators (up to 36 typically) which allows a parallel search for correlation peaks.

Conventional GPS receiving equipment is typically designed to receive GPS signals in open spaces since the satellite signals are line-of-sight and can thus be blocked by metal and other materials. Improved GPS receivers provide signal sensitivity that allows tracking GPS satellite signals indoors, or in the presence of weak multipath signals or signals that are pure reflections. The ability to acquire such weak GPS signals, however, typically causes other problems. For example, the simultaneous tracking of strong and weak signals may cause the receiver to lock on to a crosscorrelated signal, which is not a true signal. Instead of finding a weak true peak, a stronger cross-correlated peak may be acquired. Tracking a weak satellite signal does not guarantee that it is a direct signal. This weak signal may be a reflected signal or a combination of direct and indirect signals. The combined signals are referred to as multipath signals. The path of the reflected signal is typically longer than the path of the direct signal. This difference in path length causes the time-of-arrival measurement of the reflected signal to be typically delayed or the corresponding code phase measurement to contain a positive bias. In general, the magnitude of the bias is proportional to the relative delay between the reflected and direct paths. The possible absence of a direct signal component makes the existing multipath mitigation techniques (such as a narrow correlator or a strobe correlator) obsolete.

The GPS navigation message is the information transmitted to a GPS receiver from a GPS satellite. It is in the form of the 50 bit per second data stream that is modulated on the GPS signals.

The data message is contained in a data frame that is 1500 bits long. It has five subframes each of which contains GPS system time. Each subframe consists of 10 words of 30 bits each. Subframes 1 through 3 are repeated every 30 seconds. There are twenty-five pages of data appearing in sequence in the fourth and fifth subframes; one every 30 seconds. Thus, each of these twenty-five pages repeats every 750 seconds.

Subframes 4 and 5 contain two types of health or status data for the GPS satellites: (a) each of the 32 pages which contain the clock/ephemeris related almanac data provide an eight-bit satellite health status work regarding the satellite whose almanac data they carry, and (b) the $25^{th}$ page of subframe 4 and 5 jointly contain six-bit health status data for up to 32 satellites. Additional satellite health data are given in subframe 1.

Typically, a GPS receiver will receive information concerning the status (e.g. "health") of a satellite and then process the GPS signals by not acquiring and not tracking unhealthy satellites while it acquires and tracks GPS signals from healthy satellites. Alternatively, standalone GPS receivers can be designed to acquire and track unhealthy satellites but avoid using their signals in the location computation after having read the health status data from the ephemeris message from an unhealthy satellite's signal (see the related provisional patent application Method and Apparatus for Using Satellite Status Information in Satellite Positioning Systems, Serial No. 60/228,258, filed on Aug. 25, 2000, which is hereby incorporated herein by reference.)

Satellite position systems have used various types of assistance data to improve the performance of an SPS receiver. For example, an SPS receiver may receive Doppler estimates from an external source (e.g. a radio transmission to the SPS receiver). Another type of assistance data may be the identification of satellites in view of the estimated or known location of the SPS receiver. In the past, the identification of these satellites has not included any indication of whether the satellites may have a poor geometry relative to the estimated location of the SPS receiver or relative to each other. Also, in the past, the identification of satellites in view of an SPS receiver has not included an indication of poor geometry with satellite health data.

SUMMARY OF THE INVENTION

The present invention relates to methods and apparatus for determining an ordered set of SPS satellites in view of a mobile SPS receiver. One method includes determining an ordered set of SPS satellites in view of a position (e.g. a representative position) in a cell of a cellular communication system and then transmitting the ordered set of SPS satellites from a cellular transmission site located within or near the cell such that a SPS receiver located within the cell of the cellular communication system may receive the ordered set of SPS satellites.

The ordering of SPS satellites in the ordered set may be performed according to different methods, such as by minimizing a geometric dilution of precision (GDOP); by minimizing a position dilution of precision (PDOP), by minimizing a horizontal dilution of precision (HDOP), by providing a position solution which uses SPS satellites having a desired geometry relative to one another, by providing a position solution which uses SPS satellites having a desired geometry relative to the mobile SPS receiver; ordering based upon a probability of SPS satellite signal acquisition; ordering based on an estimate of measurement quality from the ordered set of SPS satellites; ordering performed by providing an optimal geometric trilateration solution, and ordering based on user defined selection criteria. Additionally, the ordering may include satellite health information.

An apparatus, in one embodiment, for creating an ordered set of SPS satellites includes; a server to determine an ordered set of SPS satellites in view of a cell of a cellular communication system at a given time and a transmitter, coupled to the server, to transmit the ordered set of SPS satellites from a cellular transmission site located within or near the cell. Thus, a mobile SPS receiver located within the cell may receive the ordered set of SPS satellites.

The server, in one embodiment, further includes a processor; and an information source coupled to the processor. The information source contains sets of SPS satellites in view of cells of the cellular service area and the processor determines the ordered set of SPS satellites for the cell within the cellular service area. The server may be a GPS reference server, a cellular switching center, a location server, a cellular transmission site, a base station controller or a mobile SPS receiver.

A method, in one embodiment, for obtaining an ordered set of SPS satellites, in view of a mobile SPS receiver includes receiving an ordered set of SPS satellites via a cellular transmission from a cellular transmission site, by a mobile SPS receiver configured to receive both SPS signals and signals transmitted from the cellular transmission site. Thus, allowing the mobile SPS receiver to search for the SPS satellites according to an order of the ordered set of SPS satellites obtained from the transmission. The mobile SPS receiver may modify searching for SPS satellites before or after acquisition of the SPS satellites based on SPS satellite health data.

An apparatus, in one embodiment, for receiving an ordered set of SPS satellites includes a mobile SPS receiver to receive SPS signals; and a receiver configured to receive signals transmitted from a cellular transmission site; such that an ordered set of SPS satellites may be transmitted via the cellular transmission site to the receiver and the mobile SPS receiver may search for the SPS satellites according to an order of the ordered set of SPS satellites.

Another embodiment, of the present invention, provides methods and apparatus enabling two-way communication with a mobile SPS receiver. A method according to this embodiment, of the present invention, includes receiving a transmission from a mobile SPS receiver within a cell of a cellular service area, the mobile SPS receiver being configured to transmit and receive cellular signals; determining an ordered set of SPS satellites in view of the mobile SPS receiver, at a given time, based in part on the transmission received; and transmitting the ordered set of SPS satellites from a cellular transmission site; such that the mobile SPS receiver may receive the ordered set of SPS satellites.

An apparatus, in one embodiment, facilitating two-way communication with a mobile SPS receiver includes a receiver to receive a transmission, from a mobile SPS receiver, originating within a cell of a cellular service area, the mobile SPS receiver being configured to transmit and receive cellular signals; a transmitter to transmit the cellular signals from a cellular transmission site; and a server to determine an ordered set of SPS satellites in view of the mobile SPS receiver; such that the ordered set of SPS satellites are transmitted by the transmitter and received by the mobile SPS receiver.

The server, in one embodiment, further includes a processor; and an information source coupled to the processor. The information source contains sets of SPS satellites in view of cells of the cellular service area and the processor determines the ordered set of SPS satellites for the cell within the cellular service area. The server may be a GPS reference server, a cellular switching center, a location server, a cellular transmission site, a base station controller or a mobile SPS receiver.

A method, in one embodiment, facilitating acquisition of an ordered set of SPS satellites in view of a mobile SPS receiver, via two-way communication by a mobile SPS receiver, includes transmitting from a cell of a cellular service area to a cellular transmission site that receives transmissions from the cell, by a mobile SPS receiver configured to receive SPS signals and to transmit and receive cellular signals. The mobile SPS receiver receives an ordered set of SPS satellites from the cellular transmission site. The ordered set of satellites are those in view of the mobile SPS receiver at a given time; such that the mobile SPS receiver may search for the SPS satellites according to an order of the ordered set of SPS satellites obtained from the transmission received from the cellular transmission site. Satellite health data may be included in the transmission and the mobile SPS receiver may modify searching for SPS satellites before or after acquisition of the SPS satellites based in part on the satellite health data. Additionally, the mobile SPS receiver may modify the ordered set subsequent to receiving.

A apparatus, in one embodiment, facilitating acquisition of an ordered set of SPS satellites in view of a mobile SPS receiver, via two-way communication by a mobile SPS receiver, includes a mobile SPS receiver to receive SPS signals; a receiver configured to receive signals transmitted from a cellular transmission site; and a transmitter to transmit cellular signals to a cellular transmission site; such that when the transmitter, located within a cell of a cellular service area, establishes communication with the cellular transmission site an ordered set of SPS satellites may be transmitted via the cellular transmission site to the receiver and the mobile SPS receiver may search for the SPS satellites according to an order of the ordered set of SPS satellites.

Another embodiment, of the present invention, provides a method to receive an ordered set of SPS satellites the ordered set being determined by a mobile SPS receiver.

Another embodiment, of the present invention, uses a history of stored GPS satellite signal quality information for a location to determine an ordered set of SPS satellites.

Another embodiment, of the present invention, uses mobile SPS receiver information to determine an ordered set of SPS satellites.

Another embodiment, of the present invention, includes determining an ordered set of SPS satellites in view of a mobile SPS receiver at a given time; and transmitting the ordered set of SPS satellites to a cellular transmission site; such that a server may receive the ordered set of SPS satellites in view of the mobile SPS receiver.

DETAILED DESCRIPTION

The present invention involves, in one embodiment, the determination of an ordered set of SPS satellites that are in view of an SPS receiver. The order of the ordered set of satellites is based on the approximate location of the SPS receiver, which is determined from identifying or knowledge of a cellular transmission site in cellular communication with a communication system of the SPS receiver. The knowledge of the cellular transmission site may be implicit in the case where the data identifying the SPS satellites in view of the SPS receiver is provided by a reference SPS receiver located in geographic proximity to the cellular transmission site communicating with the SPS receiver. In one embodiment of the present invention, the order of the ordered set of satellites is also based on the locations of the satellites relative to the approximate location of the SPS receiver.

Figure 1A:
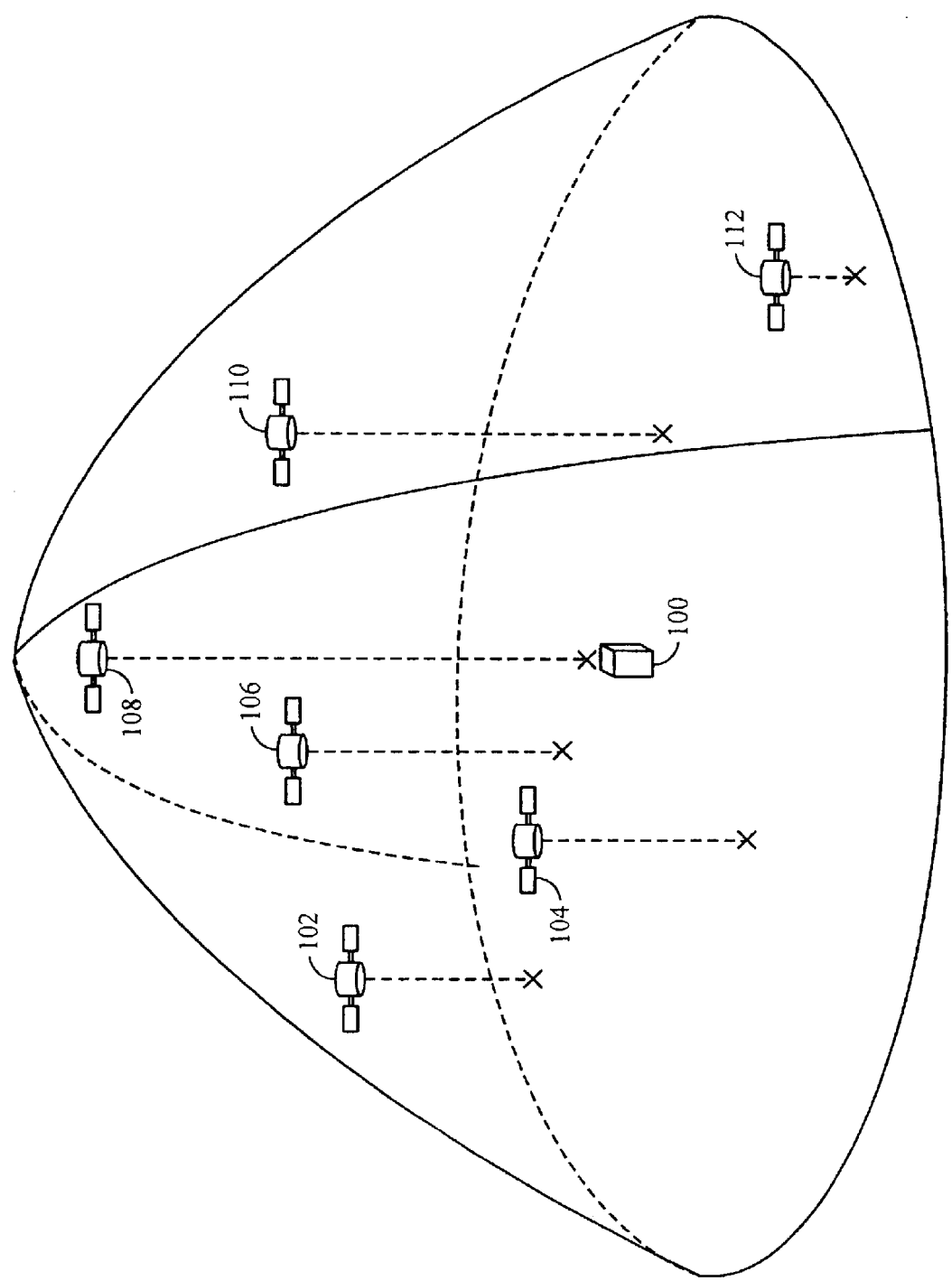
FIG. 1A shows a set of satellites in view of a satellite positioning system (SPS) receiver.
Figure 1B:
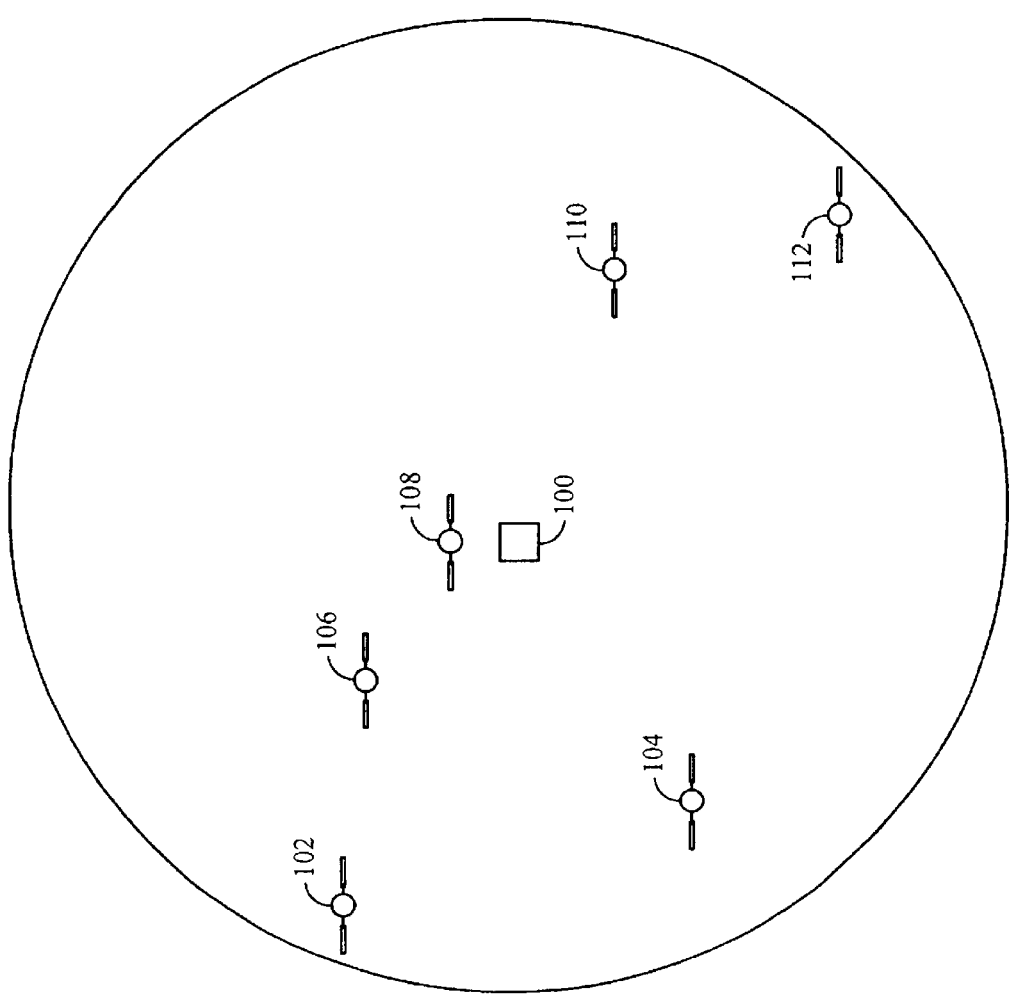
FIG. 1B shows a top-down view of the satellites shown in FIG. 1A relative to the SPS receiver.

FIG. 1A shows a set of SPS satellites that are in view of an SPS receiver 100. The SPS receiver also includes a communication system such as a 2-way cell phone or 2-way (or 1-way) pager. Examples of such communication systems which are coupled to SPS receivers are described in co-pending U.S. patent application Ser. No. 08/842,559, filed Apr. 15, 1997. Also see PCT publication WO 98/25157. FIG. 1B shows a top-down view of the satellites shown in FIG. 1A relative to SPS receiver 100. Satellites 102, 104, 106, 108, 110 and 112 are shown in locations at a particular time of day. It should be noted that because satellites change position over time, some of the SPS satellites shown in FIG. 1A may not be visible to SPS receiver 100 at different times. Furthermore, SPS receiver 100 is typically mobile. Thus, the satellites that are in view of SPS receiver 100 may change as SPS receiver 100 moves to different locations. Further, in other embodiments, the source of SPS signals may become blocked (e.g., hidden behind a building) or heavily attenuated. This blocking or attenuation may be taken into account when selecting an ordered list of satellites, which is described below.

Figure 1C:
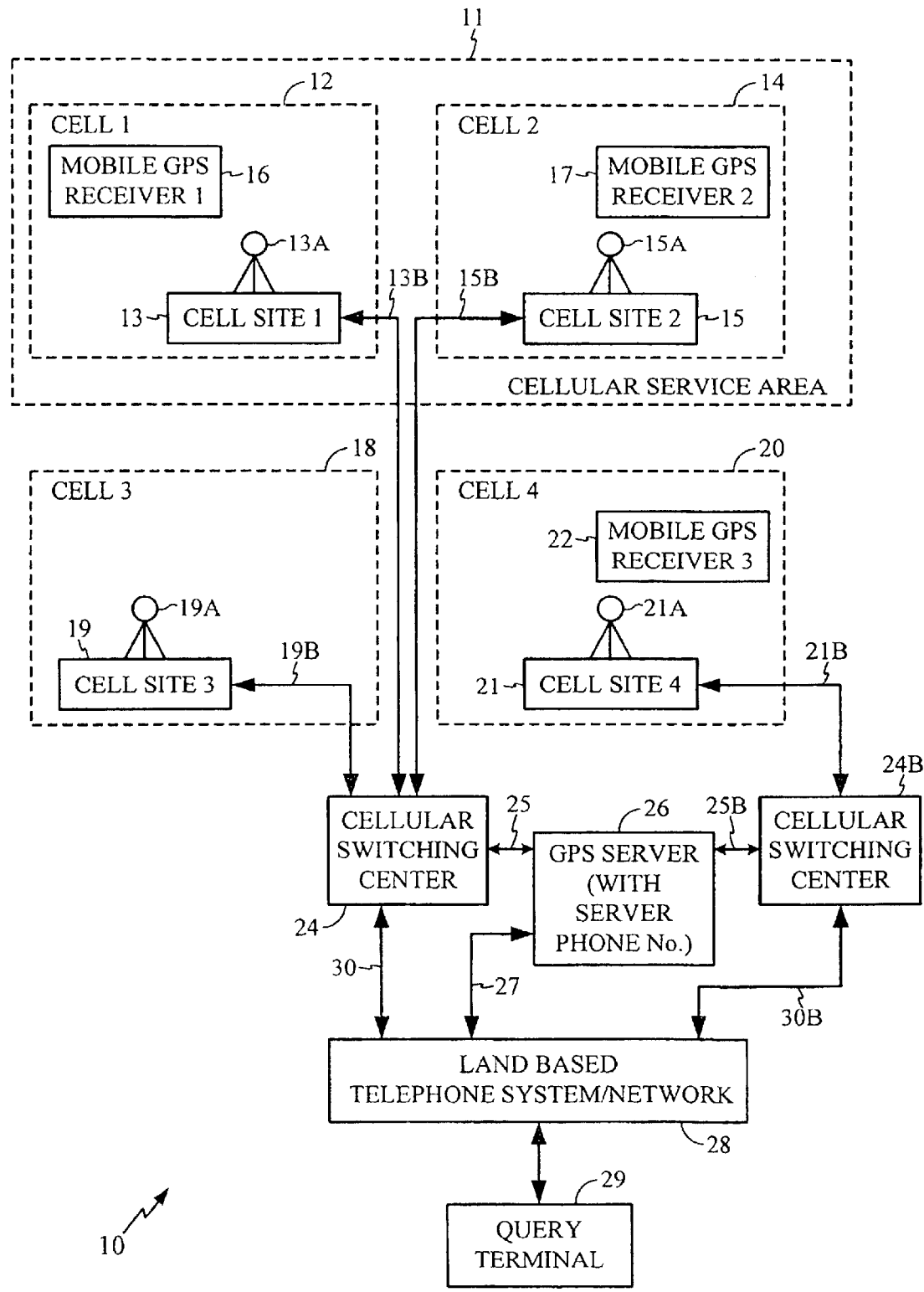
FIG. 1C illustrates a cellular communication system having a plurality of cells each of which is serviced by a cell site, and each of which is coupled to a cellular switching center.

FIG. 1C shows an example of a cellular based communication system 10 which includes a plurality of cell sites, each of which is designed to service a particular geographical region or location. Examples of such cellular based communication systems are well known in the art. See, for example, U.S. Pat. No. 5,519,760 which describes a cellular network system. The cellular based communication system 10 includes two cells 12 and 14 both of which are defined to be within a cellular service area 11. In addition, the system 10 includes cells 18 and 20. It will be appreciated that a plurality of other cells with corresponding cell sites and/or cellular service areas may also be included in the system 10 and coupled to one or more cellular switching centers, such as the cellular switching center 24 and cellular switching center 24*b*.

Figure 1D:
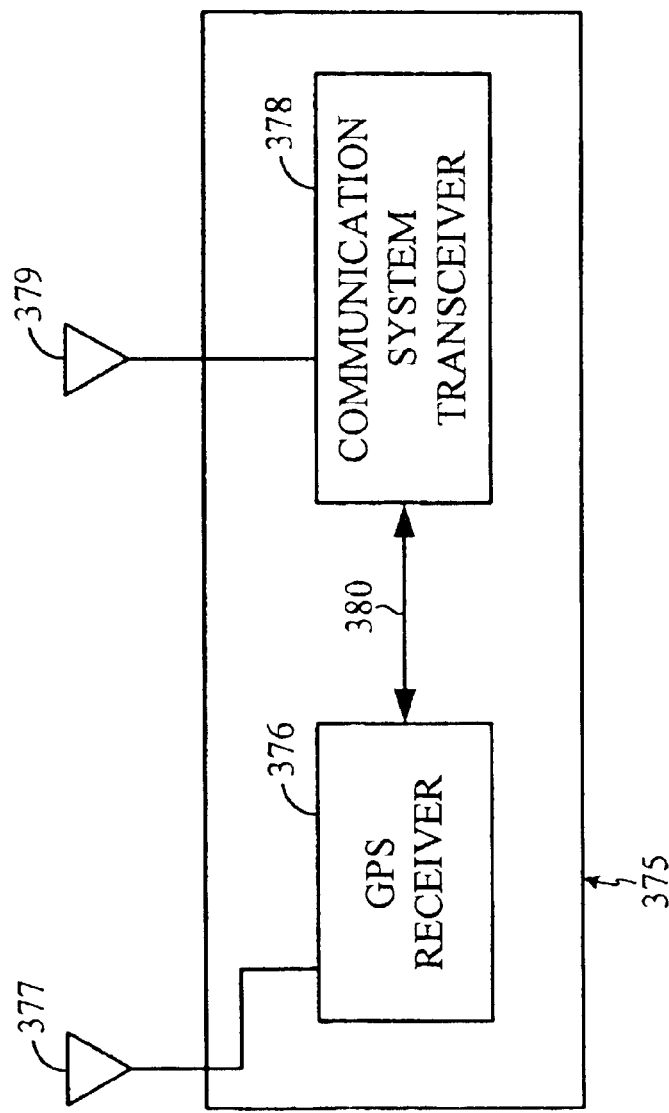
FIG. 1D illustrates an example of a combined SPS receiver and communication system according to one embodiment of the present invention.

Within each cell, such as cell 12, there is a wireless cell site or cellular site such as cell site 13 which includes an antenna 13*a* which is designed to communicate through a wireless communication medium with a communication receiver which may be a combined mobile GPS receiver and communication system such as the receiver 16 shown in FIG. 1C. An example of such a combined system is shown in FIG. 1D and may include both a GPS antenna 377 and a communication system antenna 379. It will be appreciated that alternative embodiments may employ a single antenna or more than two antennas.

Each cell site is coupled to a cellular switching center. In FIG. 1C, cell sites 13, 15, and 19 are coupled to switching center 24 through connections 13*b*, 15*b* and 19*b* respectively and cell site 21 is coupled to a different switching center 24*b* through connection 21*b*. These connections are typically wire line connections between the respective cell site and the cellular switching centers 24 and 24*b*. Each cell site includes an antenna and transmitter and receiver for communicating with communication systems serviced by the cell site. It will be appreciated that a communication system within one cell, such as the receiver 22 shown in cell 4, may in fact communicate with the cell site 19 in cell 18 due to blockage (or other reasons why cell site 21 cannot communicate with the receiver 22).

In a typical embodiment of the present invention, the mobile GPS receiver 16 includes a cellular based communication system, which is integrated with the GPS receiver, such that both the GPS receiver and the communication system are enclosed in the same housing. When this combined system is used for cellular telephone communications, transmissions occur between the receiver 16 and the cell site 13. Transmissions from the receiver 16 to the cell site 13 are then propagated over the connection 13*b* to the cellular switching center 24 and then to either another cellular telephone in a cell serviced by the cellular switching center 24, or through a connection 30 (typically wired) to another telephone through the land based telephone system/network 28. It will be appreciated that the term wired includes fiber-optic and other non-wireless connections such as copper cabling, etc. Transmissions from the other telephone, which is communicating with the receiver 16, are conveyed from the cellular switching center 24 through the connection 13*b* and the cell site 13 back to the receiver 16 in the conventional manner.

The remote data processing system 26 (which may be referred to in some embodiments as a GPS server or a location server) is included in the system 10 and is used when, in some embodiments, a mobile GPS receiver within a particular cell is used to determine the position of the receiver using GPS signals received by the GPS receiver. The GPS server 26 may be coupled to the land based telephone system/network 28 through a connection 27 and it may also be optionally coupled to the cellular switching center 24 through the connection 25 and also optionally coupled to center 24*b* through the connection 25*b*. It will be appreciated that connections 25 and 27 are typically wired connections although they may be wireless. Also shown as an optional component of the system 10 is a query terminal 29 which may consist of another computer system, which is coupled through the network 28 to the GPS server. This query terminal 29 may send a request for the position of a particular GPS receiver in one of the cells to the GPS server 26 which then initiates a conversation with a particular GPS receiver through the cellular switching center in order to determine the position of the GPS receiver and report that position back to the query terminal 29.

It should be noted that a cellular based communication system is a communication system, which has more than one transmitter, each of which serves a different geographical area, which is predefined at any instant in time. The cell sites may also move, rather than be stationary terrestial sites; for example, the cell sites in the Iridium and the Globalstar systems are low earth orbiting satellites. Typically, each transmitter is a wireless transmitter, which serves a cell, which has a geographical radius of less than 20 miles, although the area covered depends on the particular cellular system. There are numerous types of cellular communication systems, such as cellular telephones, PCS (personal communication system), SMR (specialized mobile radio), one way and two-way pager systems, RAM, ARDIS, and wireless packet data systems. Typically the predefined different geographical areas are referred to as cells and a plurality of cells are grouped together into a cellular service area such as the cellular service area 11 shown in FIG. 1C and these plurality of cells are coupled to one or more cellular switching centers which provide connections to land based telephone systems and/or networks. Service areas are often used for billing purposes. Hence, it may be the case that cells in more than one service area are connected to one switching center. For example, in FIG. 1C, cells 1 and 2 are in service area 11, and cell 3 is in service area 18, but all three are connected to switching center 24. Alternatively it is sometimes the case that cells within one service area are connected to different switching centers, especially in dense population areas. In general, a service area is defined as a collection of cells within close geographical proximity to one another. Another class of cellular systems that fits the above description is satellite based, wherein the cellular basestations are satellites that typically orbit the earth. In these systems, the cell sectors and service areas move as a function of time. Examples of such systems include Iridium, Globalstar, Orbcomm and Odyssey.

FIG. 1D shows a generalized combined GPS and communication transceiver system. The system 375 includes a GPS receiver 376 having a GPS antenna 377 and a communication transceiver 378 having a communication antenna 379. The GPS receiver 376 is coupled to the communication transceiver 378 through the connection 380 shown in FIG. 1D. In normal operation, the communication system transceiver 378 receives approximate Doppler information through the antenna 379 and provides this approximate Doppler information over the link 380 to the GPS receiver 376 which performs the pseudorange determination by receiving the GPS signals from the GPS satellites through the GPS antenna 377. Various embodiments for the combined system 375 are known in the art and have been described in the above referenced co-pending applications.

For the locations of satellites 102–112 and SPS receiver 100 shown in FIG. 1A, a prioritized acquisition order of satellites 102–112 is determined. This order represents an optimized order for acquiring SPS signals from the SPS satellites based on, for example, the geometry of the satellites relative to the position of SPS receiver 100. In one embodiment of the present invention, satellites 102–112 are listed in the order that provides a desirable geometry among satellites 102–112 and SPS receiver 100. For example, the elevation and angle of satellites 102–112 relative to SPS receiver 100 may be factors in determining the prioritized order. In yet another example, the best prioritized order/selection results in the smallest GDOP (Geometric Dilution of Precision) and/or PDOP (position dilution of precision) and/or HDOP (Horizontal Dilution of Precision). Typically, a location server responsible for message generation chooses the satellites according to a "best-n" method. In one example of such a method, the chosen satellites are those that best optimize the geometry among their locations and the location of the SPS receiver 100. For example, in a best-4 configuration, SPS satellites in FIG. 1A would be chosen to fill the ordered list of satellites, and they would be ordered as follows (highest priority to lowest priority): 108, 104, 112 and 102. The best-n satellite selection method provides the information related to satellite acquisition strategy that should be followed by SPS receiver 100. In one embodiment of the present invention, SPS receiver 100 may choose to stop the satellite acquisition process once the best-n satellites have been acquired. Thus, not all of the in view satellites need to be prioritized. In fact, the less desirable satellites may not be used at all in resolving the location of SPS receiver 100. In another embodiment the location server may provide assistance for a subset of satellites in view of the SPS receiver, such as a best-n set. The order is typically chosen to attempt to acquire first those SPS satellites which are not too close to the horizon and which provide an optimal geometric trilateration solution. The former requirement generally means that the SPS signals will be more easily received from satellites not close to the horizon and the latter requirement means that the position solution (from the pseudoranges to the highest ordered satellites in the order) will have better accuracy (less error) than a position solution which could use the lowest ordered satellites in the order. The order may reflect the expected quality of the measurements (e.g., the first satellites in the order are expected to provide higher quality measurements than the remaining satellites in the order).

It should be appreciated that satellite acquisition is a step in the location determination process. It is also appreciated that if azimuth and elevation data are provided to an SPS receiver, it could use such data to further optimize its satellite acquisition strategy. It is further appreciated that criteria other than geometry or relative location may be used to prioritize the acquisition order of satellites, such as satellite health.

Satellite health assistance protects against rogue satellite measurements. In heavily obstructed signal environments, quite often, GPS satellite signals are received with a very high dynamic range. Receiving GPS signals with signal strengths differing by more than approximately 17 dB may cause a GPS receiver to acquire a cross-correlated signal instead of a relatively weaker true signal. One procedure that may be used to detect and possibly correct or remove a cross-correlated measurement is described in co-pending U.S. patent application Ser. No. 09/241,334, filed Feb. 1, 1999, which is hereby incorporated herein by reference. However, for a GPS receiver to detect the presence of cross-correlated signals, all signals from both healthy and unhealthy satellites should be acquired. A problem would arise if a strong "unhealthy" satellite signal cross-correlates with a weak "healthy" satellite signal. Unaware of the presence of an "unhealthy" signal, a GPS receiver may not be able to detect a cross-correlation condition.

In one embodiment of the present invention, GPS reference receivers which provide reference data for location servers (also referred to as a Position Determination Entity (PDE) in CDMA cellular phone systems and Serving Mobile Location Centre (SMLC) in the GSM cellular phone systems) acquire and track all satellites in view: healthy and unhealthy. Further, all GPS technologies (e.g. a GPS receiver) integrated with or connected to wireless devices (e.g. a cellular telephone or a two-way pager) also acquire and track all satellites in view: healthy and unhealthy. In a wireless assisted GPS (WAG) mode (e.g. see examples described in co-pending U.S. patent application Ser. No. 08/842,559, filed Apr. 15, 1997, this co-pending patent application is hereby incorporated herein by reference), location server(s) may provide "health" status information to the mobiles communicating with a wireless network served by the location server(s). This health status information may accompany any other assistance information provided by the location server(s). In general, assistance information allows fast acquisition of GPS signals in highly restrictive signal environments. In order to achieve such performance improvements, assistance information may specify the satellites to be searched for, the estimated time of arrival of these signals and the expected frequency (Doppler) of the signals. This assistance information may be provided to improve a 3-dimensional search for a satellite signal. When the satellite's signals are acquired, pseudoranges, Dopplers and other satellite signal measurements are analyzed for cross-correlation conditions. In order to perform this analysis, measurements should be made for all satellites in view: healthy and unhealthy. In this embodiment, the satellite health information is used to detect a cross-correlation condition and then the cross-correlated and/or "unhealthy" satellites are analyzed to determine whether they should be included in the location computation process or corrected. Where the assistance information is provided for healthy satellites only (satellite health is implied by the satellite list) and the current and valid satellite health status information is not available to the mobile GPS receiver, the mobile will attempt to acquire only healthy satellites. In this case, a possible presence of a "strong" unhealthy satellite potentially cross-correlating with relatively weaker healthy satellites would not be known to the mobile and therefore would not be tested for. The use of undetected cross-correlated signals may lead to large positional errors thus affecting the quality of the location service.

The prioritized order may be modified based on the satellite health information.

Alternatively, health information may be directly received from the satellites and this health information may be used in the same manner described herein as the health information which is received from a transmitter at a cell site.

The health information may be transmitted from a cell site by broadcasting this information for all satellites in view of a cellular telephone basestation ("cell site"). Alternatively, it may be provided to a cellular telephone upon request (on demand) for a position of the telephone; the health information may be transmitted from the cellular telephone basestation to the cellular telephone which then provides the health information to a GPS receiver which is coupled to the cellular telephone. In the case where the information is transmitted on demand, a GPS server may determine the appropriate (e.g. updated health) information based upon a cell site which is in cellular radio/wireless communication with the phone and this cell site determines an approximate location which is used to determine satellites in view of that location and the updated health information for these satellites is then caused to be transmitted (in one case) to the cellular telephone which in turn provides the information to the mobile GPS receiver for use in processing SPS signals in the GPS receiver. In another case, the GPS server may retain the updated health information and use it to process the pseudoranges (e.g. correlation measurements) received from the mobile GPS receiver in order to determine the position of the mobile GPS receiver. In both cases, pseudoranges (e.g. correlation measurements which specify code phases) and estimated Doppler are determined even for known unhealthy GPS satellites so that cross-correlations can be detected as described here. For example, a GPS receiver may receive the updated health information from a cell site but still acquire GPS signals from a GPS satellite which was indicated to be unhealthy in the transmitted updated health information. Co-pending U.S. application Ser. No. 08/842,559, filed Apr. 15, 1997, describes a method for identifying a cell site which is in wireless communication with a cellular telephone and which then determines satellite assistance data for in view satellites based upon an approximate location derived from identifying this cell site. This method may be used with the present invention where the satellite assistance data in this case is either satellite health (e.g. based on satellite almanac) or updated satellite health (e.g. more current than the existing satellite almanac message's information concerning satellite health).

In another embodiment, an SPS receiver may, based on stored or acquired information, autonomously determine the optimum order of satellites and provide the ordered list to a location server which is responsible for message generation (and which can then provide the ordered list to other SPS receivers and/or the assistance data in the order as provided by the SPS receiver).

In yet another embodiment, a location server may, based on the information provided from a mobile SPS receiver or stored information (e.g., a history of GPS signal quality), determine an ordered list of satellites that would reflect the probability of successful signal acquisition (e.g., satellites near the horizon would have a lower probability of successful signal acquisition).

Figure 2:
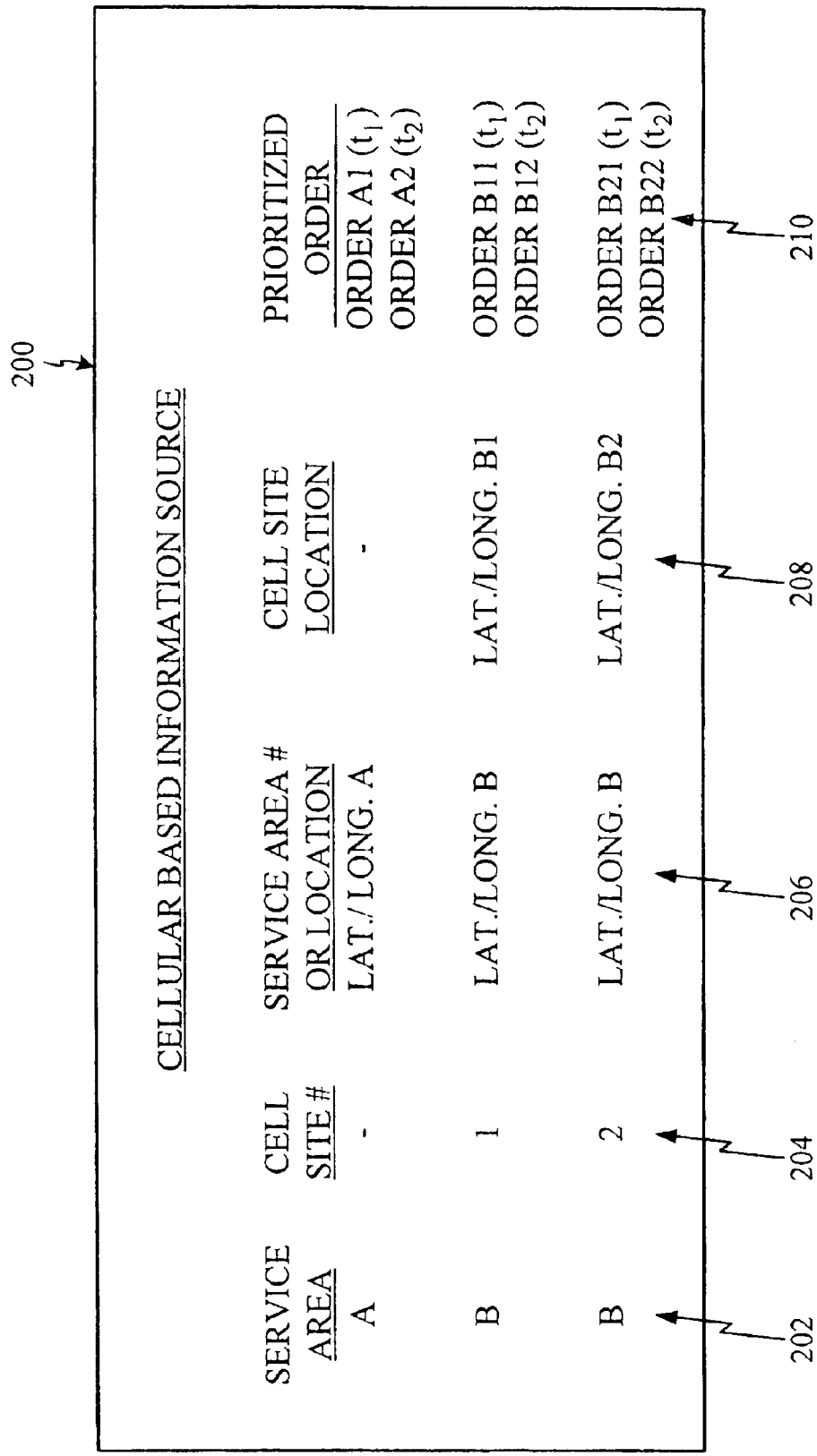
FIG. 2 shows one embodiment of a cellular based information source which provides an association between sets of prioritized orders at given times relative to cellular service areas and/or cellular cell sites, in accordance with the teachings of the present invention.

FIG. 2 shows an example of a cellular based information source which in one embodiment is maintained at an SPS server such as a global positioning system (GPS) server. Alternatively, the information source may be maintained at a cellular switching center, base station controller or at each cell site. Typically, the information source is maintained and routinely updated at the SPS server which is coupled to the cellular switching center. The information source may maintain data in various formats, and it is appreciated that the format 200 shown in FIG. 2 illustrates only one example of such formats.

Typically, each set of prioritized order information at a particular time, such as prioritized order set A1 at time $t_1$ will include a corresponding location or identification for a cell site or a service area. For example, for prioritized order sets A1 and A2 there is a corresponding identification of the cellular service area A as well as the latitude and longitude for a representative location in this service area. It is appreciated that typically this latitude and longitude is an "average" location which is generally centrally located within the geographical region of the cellular service area. However, other possible approximations may be used particularly where the cellular service area includes terrains which are not used.

As shown in the exemplary cellular based information source of FIG. 2, the cellular based information source includes a column 202 specifying the cellular service area, and a column 204 specifying a cellular site identification or number. Note that for cellular service area A the cell site identification or location is not specified, and thus the approximate location is based on a representative location in the cellular service area, and thus the prioritized orders A1 and A2 for acquiring SPS satellites are based on this location depending on the particular time, such as times $t_1$ and $t_2$. Column 206 includes a specification of the latitude and longitude for the particular representative location in the service area. Column 208 includes a specification of the latitude and longitude for the location of a particular cell site within the cellular service area which may be used as a representative location for a mobile SPS receiver which receives the prioritized order. Column 210 includes the prioritized orders of in view satellites at times $t_1$ and $t_2$ for the appropriate representative location. In an alternative embodiment, the ordered list (and the corresponding cellular based information) may be determined in real-time, near real time, continuously or on-demand.

Figure 3:
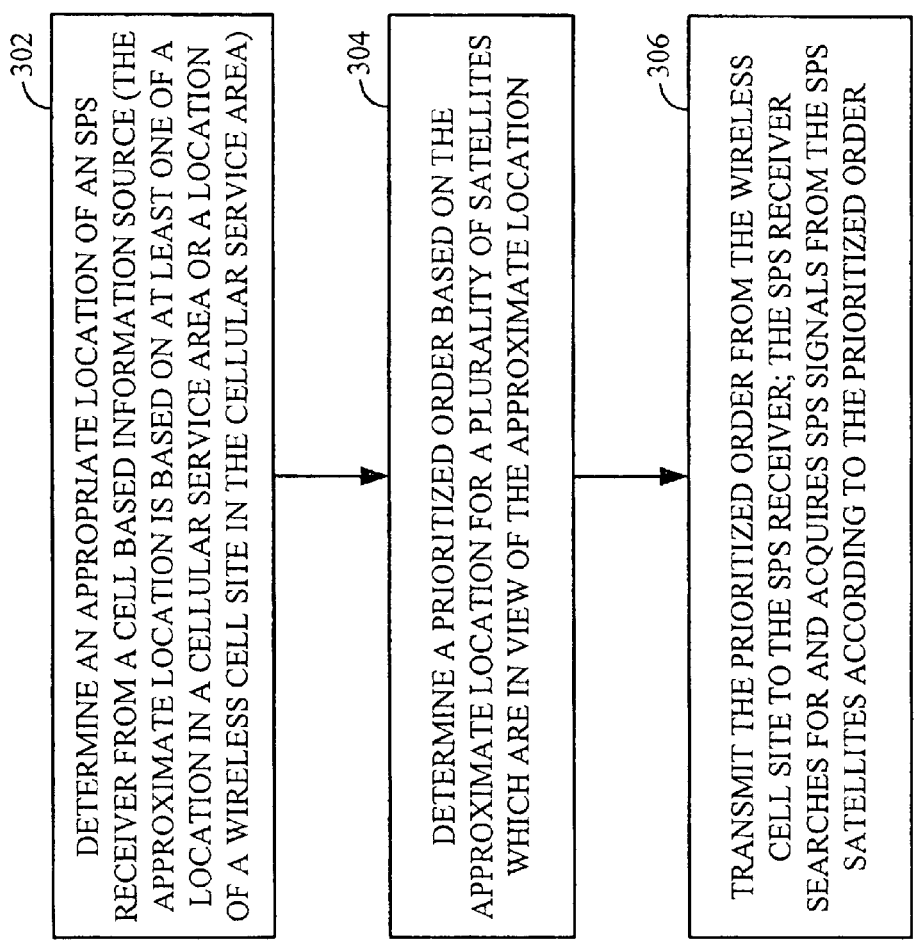
FIG. 3 is a flowchart illustrating a method for determining a prioritized order of in view satellites in accordance with the teachings of the present invention.

FIG. 3 is a flowchart illustrating one embodiment of a method for determining a prioritized order of in view SPS satellites in accordance with the teachings of the present invention. In operation 302, an approximate location of an SPS receiver is determined from a cell based information source. The SPS receiver is in wireless radio/cellular communication with at least one wireless cell site, and the identity of this cell site is determined. The approximate location is based on at least one of a representative location in a cellular service area which includes this cell or a representative location of the wireless cell site in the cellular service area and again represents the approximate location of the SPS receiver being serviced by the wireless cell site. A cellular based information source (e.g. see FIG. 2) may be used to look up or determine the approximate location based on the identification of the wireless cell site which is in communication with a cellular communication system which is coupled to the SPS receiver. Alternatively, the cellular based information source may be used to look up or determine the appropriate prioritized order directly from the identification of the wireless cell site which is in communication with the SPS receiver. In operation 304, a prioritized order based on the approximate location of the SPS receiver (or the identification of the wireless cell site communicating with the SPS receiver through a cellular communication system which is coupled to the SPS receiver) is determined for the satellites that are in view of the approximate location. In one embodiment of the present invention, the satellites are prioritized according to their location relative to the approximate location of the SPS receiver. In another embodiment of the present invention, the satellites are prioritized according to their location relative to one another and relative to the approximate location. It is appreciated that some criteria other than geometry may be used to prioritize the order. In operation 306, the prioritized order is transmitted from the wireless cell site to the SPS receiver and the SPS receiver then searches for and acquires SPS signals from the SPS satellites in the order designated in the prioritized order sent to the SPS receiver.

A more detailed discussion of cellular communication systems and their use with SPS receivers is disclosed in U.S. patent application Ser. No. 08/842,559, now U.S. Pat. No. 6,208,290, filed on Apr. 15, 1997, titled "An Improved GPS Receiver Utilizing a Communication Link" by Norman F. Krasner.

The prioritized order of SPS satellites provided by the location server or derived from the SPS receiver may be used to improve time to acquire satellites, time required to determine location information, and may reduce the bandwidth requirements for providing data from the location server to the SPS receiver.

In this discussion, embodiments of the present invention have been described with reference to application in the United States Global Positioning System (GPS) system, which is an example of an SPS system. It should be evident, however, that these methods are equally applicable to other satellite positioning systems, such as the Russian Glonass system. Thus, the term "GPS" used herein includes such alternative satellite positioning systems, including the Russian Glonass system. Likewise, the term "GPS signals" includes signals from alternative satellite positioning systems.

Furthermore, although embodiments of the present invention are described with reference to GPS satellites, it will be appreciated that the teachings are equally applicable to positioning systems which utilize pseudolites or a combination of satellites and pseudolites. Pseudolites are ground based transmitters which broadcast a PN code (similar to a GPS signal) modulated on an L-band (or other frequency) carrier signal, generally synchronized with GPS time. Each transmitter may be assigned a unique PN code so as to permit identification by a remote receiver. Pseudolites are useful in situations where GPS signals from an orbiting satellite might be unavailable, such as tunnels, mines, buildings, urban canyons or other enclosed areas. The term "satellite", as used herein, is intended to include pseudolites or equivalents of pseudolites, and the term GPS signals, as used herein, is intended to include GPS-like signals from pseudolites or equivalents of pseudolites.

In the foregoing detailed description, the apparatus and method of the present invention have been described with reference to specific exemplary embodiments. However, it will be evident that various modifications and changes may be made without departing from the broader scope and spirit of the present invention. The present specification and figures are accordingly to be regarded as illustrative rather than restrictive.

What is claimed is:

1. A method, comprising:
   determining an ordered set of SPS satellites in view of a location of a cell of a cellular communication system at a given time, wherein an order of SPS satellites in the ordered set is determined in a manner selected from the group consisting of,
   minimizing a geometric dilution of precision (GDOP),
   minimizing a position dilution of precision (PDOP),
   minimizing a horizontal dilution of precision (HDOP),
   providing a position solution which uses SPS satellites having a desired geometry relative to one another,
   providing a position solution which uses SPS satellites having a desired geometry relative to the mobile SPS receiver,
   determining a probability of SPS satellite signal acquisition,
   determining an estimate of measurement quality from the ordered set of SPS satellites,
   providing an optimal geometric trilateration solution, and
   determining a user defined selection criteria; and
   wherein a mobile SPS receiver located within the cell of the cellular communication system may receive the ordered set of SPS satellites, and transmitting the ordered set of SPS satellites.

2. A method, as in claim 1, wherein said determining is done according to a Best-n method and said determining further comprises determining satellite health information.

3. A method, comprising:
   receiving a transmission from a mobile satellite positioning system (SPS) receiver within a cell of a cellular communication system, the mobile SPS receiver being configured to transmit and receive cellular signal;
   determining an ordered set of SPS satellites in view of the mobile SPS receiver, at a given time, based in part on said receiving, wherein an order of SPS satellites in the ordered set is determined in a manner selected from the group consisting of,
   minimizing a geometric dilution of precision (GDOP),
   minimizing a position dilution of precision (PDOP),
   minimizing a horizontal dilution of precision (HDOP),
   providing a position solution which uses SPS satellites having a desired geometry relative to one another,
   providing a position solution which uses SPS satellites having a desired geometry relative to the mobile SPS receiver,
   determining a probability of SPS satellite signal acquisition,
   determining an estimate of measurement quality from the ordered set of SPS satellites,
   providing an optimal geometric trilateration solution, and
   determining a user defined selection criteria, and
   transmitting the ordered set of SPS satellites;
   such that the mobile SPS receiver may receive the ordered set of SPS satellites.

4. A method, as in claim 3, wherein said determining is done according to a Best-n method and said determining further comprises determining satellite health information.

5. A computer readable medium containing executable computer program instructions which when executed by a data processing system, cause the data processing system to perform a method comprising:
   determining an ordered set of satellite positioning system (SPS) satellites in view of a location of a cell of a cellular communication system at a given time, wherein an order of SPS satellites in the ordered set is determined in a manner selected from the group consisting of,
   minimizing a geometric dilution of precision (GDOP),
   minimizing a position dilution of precision (PDOP),
   minimizing a horizontal dilution of precision (HDOP),
   providing a position solution which uses SPS satellites having a desired geometry relative to one another,
   providing a position solution which uses SPS satellites having a desired geometry relative to the mobile SPS receiver,
   determining a probability of SPS satellite signal acquisition,
   determining an estimate of measurement quality from the ordered set of SPS satellites,
   providing an optimal geometric trilateration solution, and
   determining a user defined selection criteria; and
   transmitting the ordered set of SPS satellites.

6. A computer readable medium, as in claim 5, wherein said determining is done according to a Best-n method and said determining further comprises determining satellite health information.

* * * * *